June 28, 1960     B. MICHALKO     2,942,297
APPARATUS FOR SHAPING THERMOPLASTIC FABRICS
Filed Sept. 27, 1956     2 Sheets-Sheet 1

INVENTOR.
BENJAMIN MICHALKO
BY
ATTORNEY

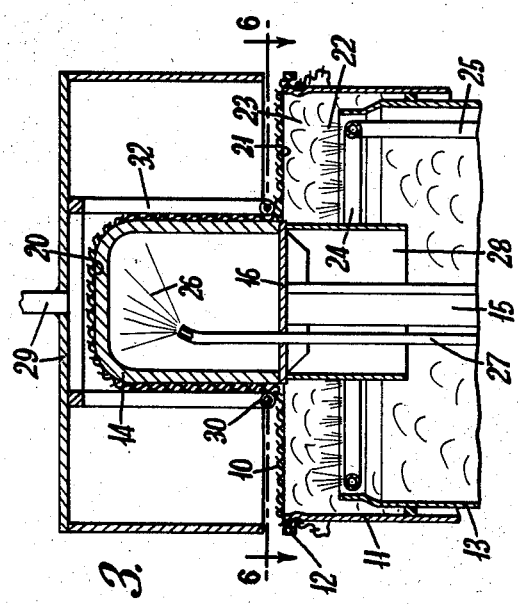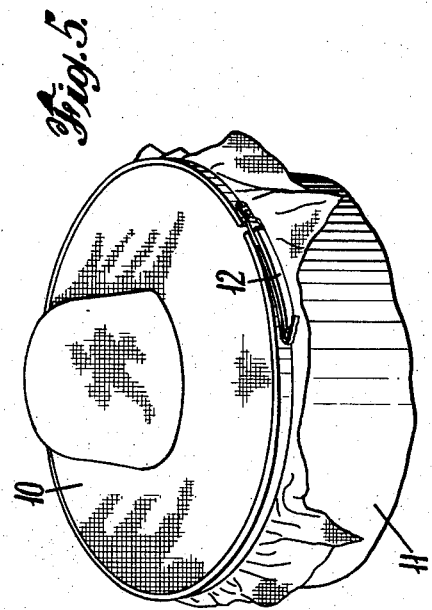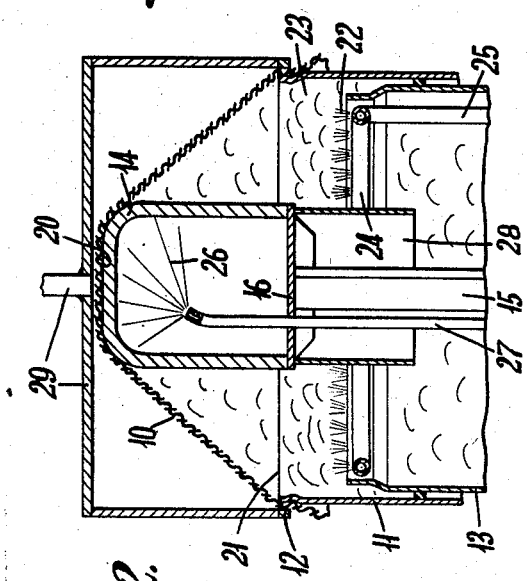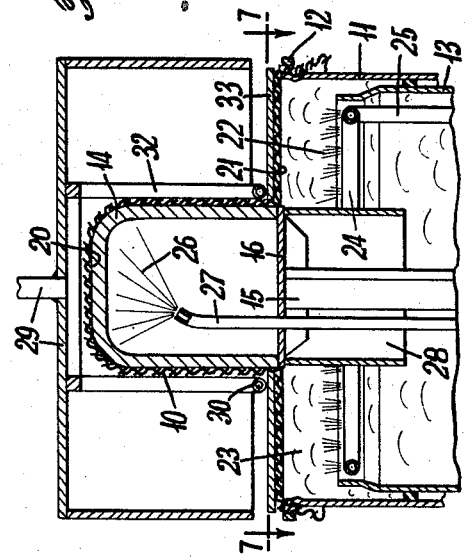

United States Patent Office 2,942,297
Patented June 28, 1960

2,942,297
APPARATUS FOR SHAPING THERMOPLASTIC FABRICS

Benjamin Michalko, Charleston, W. Va., assignor to Union Carbide Corporation, a corporation of New York Filed Sept. 27, 1956, Ser. No. 612,396

2 Claims. (Cl. 18—19)

This invention relates to thermoplastic resins, and more particularly, to an improved apparatus for shaping textile fabric composed of thermoplastic fibers.

The manufacture of wearing apparel and other textile articles by the molding or shaping of thermoplastic fabrics has been an attractive goal for many years. The usual method for producing articles of this nature, e.g. hats, brassiere cups, shoe uppers, etc., is to suitably heat the thermoplastic material to a temperature permitting deformation, and while the fabric is hot, to stretch or draw a restricted area of the material into a desired shape by means of a mold or die. After formation is complete, the fabric is then set by an effective reduction of temperature. In this manner, a thermoplastic fabric may be formed into the symmetrical or irregular three-dimensional shapes ordinarily required for the types of articles heretofore mentioned. This method of operation, however, often possesses certain disadvantages which may prevent its satisfactory utilization for the production of many shaped thermoplastic textile articles. During the procedure, a greater degree of strain is engendered in certain fabric areas by the application of distortional stress or tension sufficient to obtain the required maximum displacement from the original plane of the material. For instance, in the manufacture of hats, this area would be found in the crown of the hat, as compared to the minimal fabric displacement required for the brim. The non-uniform application of stretching tension directly engenders areas of varying strain within the fabric, resulting in a finished product characterized by undesirable differences in fabric porosity and general appearance. In addition, structural weaknesses within the shaped articles are produced, and the flexibility of their design is substantially diminished.

It is an object of the present invention to overcome the disadvantages of the prior art by providing an apparatus for the production of shaped thermoplastic textile fabrics, the articles produced exhibiting a high degree of uniformity in fabric construction, porosity, and general appearance.

It is another object of the present invention to provide an apparatus for the production of shaped textile fabrics composed of thermoplastic fibers, wherein stretching tension may more uniformly be imposed during the shaping operation.

Still other objects will become apparent from the following description.

The objects of the present invention are achieved by means permitting the shaping of an initially heated thermoplastic fabric into desired form under conditions permitting a mechanical distribution and balance of deformational effects throughout the fabric during the shaping operation. Of prime importance to the invention is the rolling of an initially heated fabric over a mold, thereby simultaneously stretching and conforming the fabric into desired shape. This simultaneous rolling procedure permits a more uniform application of stress, i.e. stretching tension, throughout the fabric during the shaping operation, and results in the production of shaped textile articles exhibiting a substantially high degree of uniformity in structure and appearance.

This shaping operation is necessarily performed in the presence of a source of heat sufficient to initially elevate the temperature of the thermoplastic material to a degree which will permit permanent deformation as stress is applied. The uniform introduction of heat to the fabric is vital to the process, for an uneven heat treatment will ultimately result in a heterogeneous fabric structure in the articles produced.

In an embodiment of the invention, the shaping of a thermoplastic fabric is accomplished by stretching or drawing the heated fabric into form by means of a suitably shaped mold and a shaping ring of convenient size, fitted with a revolvable surface. Conformation of the fabric to the desired shape of the mold is effected by a movement of the shaping ring and mold relative to each other, whereby the fabric and mold are passed through the shaping ring in a manner assuring the maintenance of the fabric in substantially continuous contact with the mold.

In the embodiment of the invention as described above, the shaping ring is circumferentially composed of closely spaced rollers which can readily turn under the force of extremely small differences in tension. As the shaping ring is moved relative to the mold, the fabric is simultaneously stretched and rolled over the mold, conforming it thereto in shape. Many prior art techniques for shaping thermoplastic material utilize a non-revolvable shaping ring or other similar female shaping device. As a result, the application of stretching tension is for the most part restricted to that limited area of material passing through the shaping ring, while relatively less stress is imposed upon the remaining unshaped fabric. The restriction is due to the snubbing effect that is created when the fixed or stationary surface of the shaping ring presses against the fabric, the latter material thereby contacting the mold. This limited or non-uniform application of stretching tension engenders areas of varying strain within the fabric, and results in the production of undesirably constructed products. By employing a shaping ring possessing a revolvable surface, thereby simultaneously stretching and rolling the fabric over the mold, the greater distortional stress initially applied to that fabric area contacting the mold, and the accompanying strain, may more uniformly be distributed and balanced throughout the fabric. Consequently, during the shaping operation, the present invention permits the production of more uniform and deeper drawn textile articles.

In a co-pending patent application, Serial No. 605,379, filed August 21, 1956, now issued as U.S. 2,924,852, an improved method for shaping thermoplastic fabrics is disclosed. The method comprises reducing the temperature of an initially heated fabric in those areas to which the greatest distortional stress is applied during the shaping operation, the reduction of temperature being effected concurrently with the shaping of the fabric. This control of temperature in the various fabric areas during formation is shown to engender increased uniformity in product appearance and porosity.

In a preferred embodiment, the present invention constitutes a novel improvement over the method and apparatus described in the copending application. In accordance with this preferred embodiment, my cooling arrangement is employed whereby the mold, utilized to impart desired shape to the fabric, is maintained at a temperature below that to which the fabric is initially elevated. The material contacting the cooler mold, to which greatest distortional stress is being applied, is thereby reduced in temperature. By simultaneously stretching and rolling the fabric over the cooler mold in the manner of the invention, a maximum distribution and balance of deformational effects may be achieved throughout the fabric. The use of the mold at environmental or fabric temperature may, however, also be of benefit to the production of a uniformly constructed product when the material is conformed to shape by means of the simultaneous stretching and rolling technique heretofore described.

The present invention may be better illustrated in connection with the accompanying drawings, wherein.

Figs. 2–4 are sectional elevations showing the apparatus during the shaping operation.

Fig. 5 is a perspective view illustrating a shaped thermoplastic fabric and the apparatus of the invention at the completion of the shaping operation.

Figure 1:
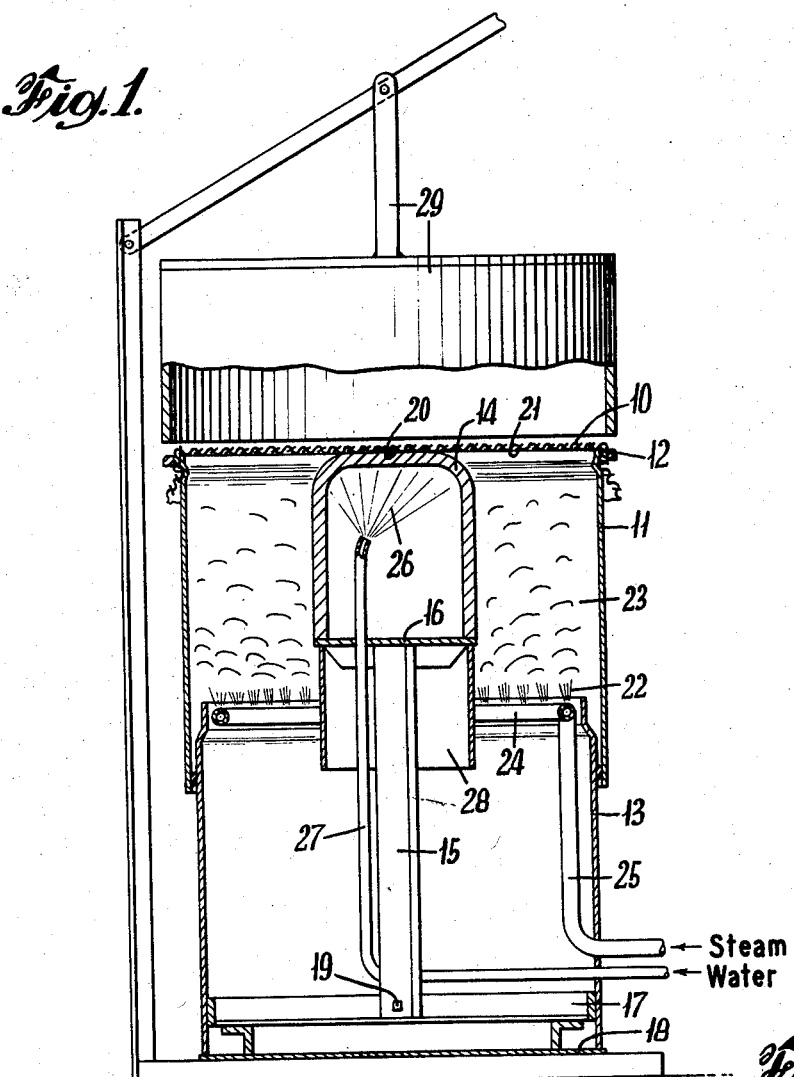
Fig. 1 is a sectional elevation showing an apparatus for the production of shaped thermoplastic fabrics, illustrating the position of the parts prior to any shaping action.

In accordance with the present invention, as shown in Fig. 1, a relatively flat fabric 10, composed of thermoplastic fibers, is fastened securely at the perimeter of an open cylinder 11 of suitable size by means of a hoop-like fastener 12, with which the cylinder 11 is fitted. Preferably, care should be taken so that the fabric 10 is not drawn taut across the cylinder 11. The positioning of the fabric 10 between the cylinder 11 and fastener 12 may also be seen in Fig. 5 of the drawings.

Returning to Fig. 1, the cylinder 11, over which the fabric 10 is positioned, is then placed over an inner cylinder 13 of slightly smaller diameter so that the cylinder walls fit closely together, permitting the outer cylinder 11 to slide easily over the inner one 13. A suitably shaped, hollow form mold 14, preferably made of any thermally conductive material, such as aluminum, is mounted in a manner extending from the inner cylinder 13 by means of an extension rod 15 attached to the base 16 of the mold 14, and a supporting rack 17, secured to the base 18 of the inner cylinder 13 to which the mold extension rod 15 is affixed at its distal end 19. The mold 14 is mounted at the common centers of the two cylinders 11 and 13, and extends upwards from the inner cylinder 13 to an extent such that the apex area 20 of the mold 14 is level with the top 21 of the outer cylinder 11 when the latter is at its highest position. In this manner, the thermoplastic fabric 10 will just contact the apex 20 of the mold 14.

With the outer cylinder 11 at its highest position, high pressure steam 22 is injected into the chamber 23 formed by the two cylinders 11 and 13 by means of a loop of perforated metal tubing 24 supported near the top of the inner cylinder 13, somewhat smaller in diameter than the inner cylinder 13, and connected to a high pressure steam line 25. At the same time, a spray of cold water 26 is introduced into the hollow form mold 14 by means of a water supply tube 27 suitably inserted into the mold 14 so as to maintain the mold 14 at a temperature desirably lower than that to which the fabric 10 is initially elevated. The introduced water 26 is then led out of the mold 14 by means of a water drain 28 attached to the base 16 of the mold 14. The temperature of the fabric 10, and of the mold 14, is determined by means of thermocouples located just below the top of the inner cylinder 13 and in the mold 14. After the fabric 10 is satisfactorily heated and the mold 14 cooled, the outer cylinder 11 is pressed downward by means of a lever assembly 29 until the top of the outer cylinder is at a height approximately level with the base 16 of the mold 14. The position of the fabric and apparatus may now be seen in Fig. 2 of the drawings.

Figure 6:
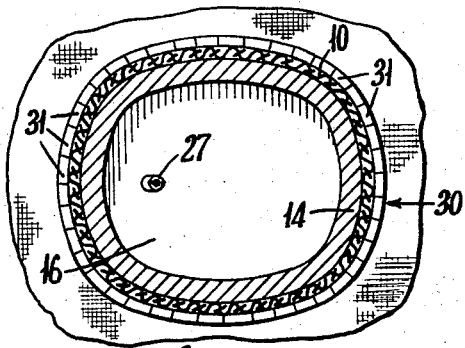
Fig. 6 is a transverse sectional view along line 6—6 of Fig. 3.

Subsequently, as shown in Fig. 3, pressure of the lever assembly 29 against the outer cylinder 11 is released, and the assembly elevated. A shaping ring 30, consisting of closely fitted rollers 31 (see also Fig. 6), and defining an opening substantially equal in diameter to the diameter of the mold 14 plus twice the thickness of the thermoplastic fabric, is then placed over the apex 20 of the mold 14 and the contacting fabric 10. By means of a downward thrust of the lever assembly 29, and a shaping rack 32 positioned between the lever assembly 29 and the shaping ring 30, the shaping ring 30 is rolled over the fabric 10 and mold 14, simultaneously stretching the fabric into desired shape. The utilization of a revolvable surface or rollers 31 for the application of stretching tension in the manner of the invention permits a more uniform distribution of stress and strain throughout the fabric 10, and the conjunctive utilization of a cooled mold 14 greatly enhances this effect.

After the fabric is drawn to desired shape in this manner, the supply of steam 22 and water 26 are discontinued, and the fabric 10 cooled. In certain instances, e.g. the production of shaped textile articles such as hats etc., a sharply defined angle is desired between the fabric displaced from its original place, i.e., in contact with the mold, and the remaining unshaped fabric.

Figure 7:
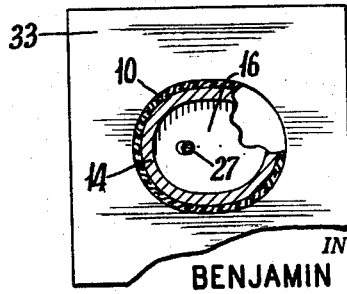
Fig. 7 is a transverse sectional view along line 7—7 of Fig. 4.

To achieve this definition, as shown in Fig. 4, of the drawings, the shaping ring 30 is removed, and a shaping plate 33 (see also Fig. 7) having a central opening equal in diameter to the shaping ring 30 is placed over the fabric 10 and the apex 20 of the mold 14. The shaping plate 33 is then pressed downward thereover by means of the lever assembly 29 and the shaping rack 32 in a manner similar to that described for operation with the shaping ring 30. The shaping ring 30 may also be utilized in this procedure, by positioning it between the shaping rack 32 and the shaping plate 33. The fabric is then heated by a re-introduction of steam 22 until the desired angle is sharply defined. During this procedure the mold may again be cooled by a spray of cold water 26. The supply of steam 22 and water 26 are then discontinued, and the shaped fabric 10 subsequently cooled and removed.

In an embodiment of the present invention, the shaping operation is performed while the fabric is heated to at least the second order transition temperature of the thermoplastic fibers therein, i.e., that temperature at which the amorphous phase of the fiber melts. The fabric should not, however, be elevated to temperatures effecting fabric damage, as evidenced by a noticeable color change, or a fusing of fibers.

When the apparatus described above is employed, a maximum temperature of approximately 205° F. may be expected in the atmosphere beneath the fabric. If higher fabric temperatures are desired, the inner cylinder may be closed at the bottom, thereby forcing all the steam up through the fabric or by enclosing the entire apparatus in a pressurized vessel. Additional control over the temperature of the fabric may be obtained by varying the amount of steam introduced to the fabric, or by substituting other heating media, such as hot air or water for the steam.

The shaping ring employed in the present invention is preferably fitted with closely spaced metal rollers. The rollers may also be made from thermosetting materials, such as phenolic resins, or from other revolvable material, such as flexible tubing, springs, wood, or ceramics.

During the shaping operation, the mold is preferably reduced to that temperature which will permit the greatest uniformity of fabric structure in the shaped articles, the means for said temperature reduction being compatible with the maintenance of a constant source of heat to the unshaped fabric. In the apparatus described above, the mold was cooled by a water spray directed at the apex of the mold. Other cooling means convenient to the operation may also be utilized. For example, the mold may be cooled by air, by means of a water jacket built into the mold, or by means of a metal coil attached to the inner surface of the mold, through which water may be pumped at a desired temperature.

The textile materials preferably employed in the present invention are those made from thermoplastic fibers having a second order transition temperature above the temperature at which the shaped article is ultimately to be used. Good results have been obtained, for example, utilizing fabrics composed of polymers or copolymers of acrylonitrile. If the second order transition temperature is, however, below the temperature of use, subsequent annealing treatment of the shaped fabric is ordinarily necessary. The fabric employed may be either non-woven, woven, or knitted, and the fiber therein may be present in either substantially continuous or short, staple lengths. Other changes or variations may be made in the manner in which the method of the invention is performed and in the apparatus for carrying it out, without departing from the scope of the appended claims.

What is claimed is:

1. An apparatus for shaping textile fabrics composed of thermoplastic fibers which comprises a means for introducing a heating fluid uniformly to the entire body of said textile fabric; a suitably shaped male mold member to which said textile fabric is conformed in shape; a female mold member defining an opening substantially equal in diameter to the diameter of said male mold member plus twice the thickness of said textile fabric, said female mold member being circumferentially fitted about said opening with a revolvable surface; a clamping means to secure said textile fabric at the marginal edges thereof whereby a limited section of the textile fabric encompassed within the larger textile fabric area defined by the clamped marginal edges is positioned between said male and female mold members; and a means for supporting the movement of said male and female mold members relative to each other whereby said textile fabric and said male mold member are passed through the opening of said female mold member.

2. An apparatus for shaping textile fabrics composed of thermoplastic fibers which comprises a means for introducing a heating fluid uniformly to the entire body of said textile fabric; a suitably shaped male mold member to which said textile fabric is conformed in shape; a female mold member defining an opening substantially equal in diameter to the diameter of said male mold member plus twice the thickness of said textile fabric, said female mold member being circumferentially fitted about said opening with closely spaced, freely revolvable elements; a clamping means to secure said textile fabric at the marginal edges thereof whereby a limited section of the textile fabric encompassed within the larger textile fabric area defined by the clamped marginal edges is positioned between said male and female mold members; a means for supporting the movement of said male and female mold members relative to each other whereby said textile fabric and said male mold member are passed through the opening of said female mold member; and a means for introducing a cooling fluid to the male mold member.

References Cited in the file of this patent

UNITED STATES PATENTS

| | | |
|---|---|---|
| 669,331 | Thurber | Mar. 5, 1901 |
| 1,760,288 | Stevens | May 27, 1930 |
| 2,190,807 | Steinberger | Feb. 20, 1940 |
| 2,255,116 | Helmstaedter | Sept. 9, 1941 |
| 2,295,066 | Weikert | Sept. 8, 1942 |
| 2,304,989 | Snowdon | Dec. 15, 1942 |
| 2,357,806 | Borkland | Sept. 12, 1944 |
| 2,419,758 | Borkland | Apr. 29, 1947 |
| 2,452,999 | Daly et al. | Nov. 2, 1948 |
| 2,693,618 | Pfeiffer | Nov. 9, 1954 |